(12) United States Patent
Esterberg et al.

(10) Patent No.: US 11,609,241 B2
(45) Date of Patent: Mar. 21, 2023

(54) DISPENSER PLATFORMS

(71) Applicant: HEWLETT-PACKARD DEVELOPMENT COMPANY, L.P., Spring, TX (US)

(72) Inventors: Dennis R. Esterberg, Corvallis, OR (US); Christie Dudenhoefer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 152 days.

(21) Appl. No.: 16/769,850

(22) PCT Filed: Jan. 26, 2018

(86) PCT No.: PCT/US2018/015556
§ 371 (c)(1),
(2) Date: Jun. 4, 2020

(87) PCT Pub. No.: WO2019/147274
PCT Pub. Date: Aug. 1, 2019

(65) Prior Publication Data
US 2021/0172971 A1  Jun. 10, 2021

(51) Int. Cl.
*G01N 35/10* (2006.01)
*G01N 35/02* (2006.01)
*G01N 35/04* (2006.01)
*B01L 9/00* (2006.01)

(52) U.S. Cl.
CPC ........... *G01N 35/109* (2013.01); *B01L 9/523* (2013.01); *G01N 35/028* (2013.01); *G01N 35/04* (2013.01); *G01N 2035/0424* (2013.01); *G01N 2035/0474* (2013.01)

(58) Field of Classification Search
None
See application file for complete search history.

(56) References Cited

U.S. PATENT DOCUMENTS

| 4,586,546 A | 5/1986 | Mezei |
| 7,270,784 B2 | 9/2007 | Vuong et al. |
| 2003/0054543 A1 | 3/2003 | Lafferty |
| 2004/0133288 A1* | 7/2004 | Hatcher ............... G01N 35/109 700/56 |
| 2005/0079592 A1 | 4/2005 | Takagi |
| 2007/0216892 A1 | 9/2007 | Eidelberg |

(Continued)

FOREIGN PATENT DOCUMENTS

| EP | 1658894 A1 | 5/2006 | |
| EP | 3239716 A1 * | 11/2017 | ........... G01N 1/2813 |
| WO | WO-200182013 A1 | 11/2001 | |

OTHER PUBLICATIONS 600 mm Linear Motor Stage and Controller, THORLABS; downloaded Nov. 23, 2017.

(Continued)

*Primary Examiner* — P. Kathryn Wright
(74) *Attorney, Agent, or Firm* — Foley & Lardner LLP

(57) ABSTRACT

In one example, a dispenser platform can include an enclosure that includes a first actuator to move a support in a first plane, wherein a portion of the support extends outside the enclosure, and a second actuator coupled to the portion of the support that extends outside the enclosure to move a stage coupled to the support in a second plane.

19 Claims, 5 Drawing Sheets

(56) References Cited

U.S. PATENT DOCUMENTS

| | | |
|---|---|---|
| 2009/0114574 A1 | 5/2009 | Deggerdal |
| 2010/0236930 A1 | 9/2010 | Vann |
| 2014/0323358 A1 | 10/2014 | Oldham et al. |
| 2016/0377563 A1 | 12/2016 | Macke |
| 2020/0292569 A1* | 9/2020 | Esterberg ......... G01N 35/00029 |

OTHER PUBLICATIONS

DSX® 4-Plate ELISA Processing System, 2014, Dynex Technologies.

Linear Slide Positioners, Newmark Systems Inc; downloaded Nov. 23, 2017.

Suryawanshi, V. V., et al., Design and Development of Stepper Motor Based XY Scanning Stage, vol. 4, Issue 9, Sep. 2015; IJIRSET.

* cited by examiner

DISPENSER PLATFORMS

CROSS-REFERENCE TO RELATED APPLICATIONS

This Utility Patent Application is a U.S. National Stage filing under 35 U.S.C. § 371 of PCT/US2018/015556, filed Jan. 26, 2018, which is incorporated by reference herein.

BACKGROUND

Media dispensers or fluid dispensers may be utilized to dispense precise quantities of media or fluid. The fluid dispensers may be utilized for dispensing a specific quantity of liquid at a specific location of a substrate or substrate nest. For example, a substrate nest can be utilized to couple a substrate that may include a plurality of wells that may each be utilized separately to perform a separate experiment. In this example, a specific quantity of a particular liquid may be deposited into each of the plurality of wells of the substrate. In some examples, when a specific well of the plurality of wells is not provided with the specific quantity of the particular liquid an experiment may be compromised.

DETAILED DESCRIPTION

Figure 1:
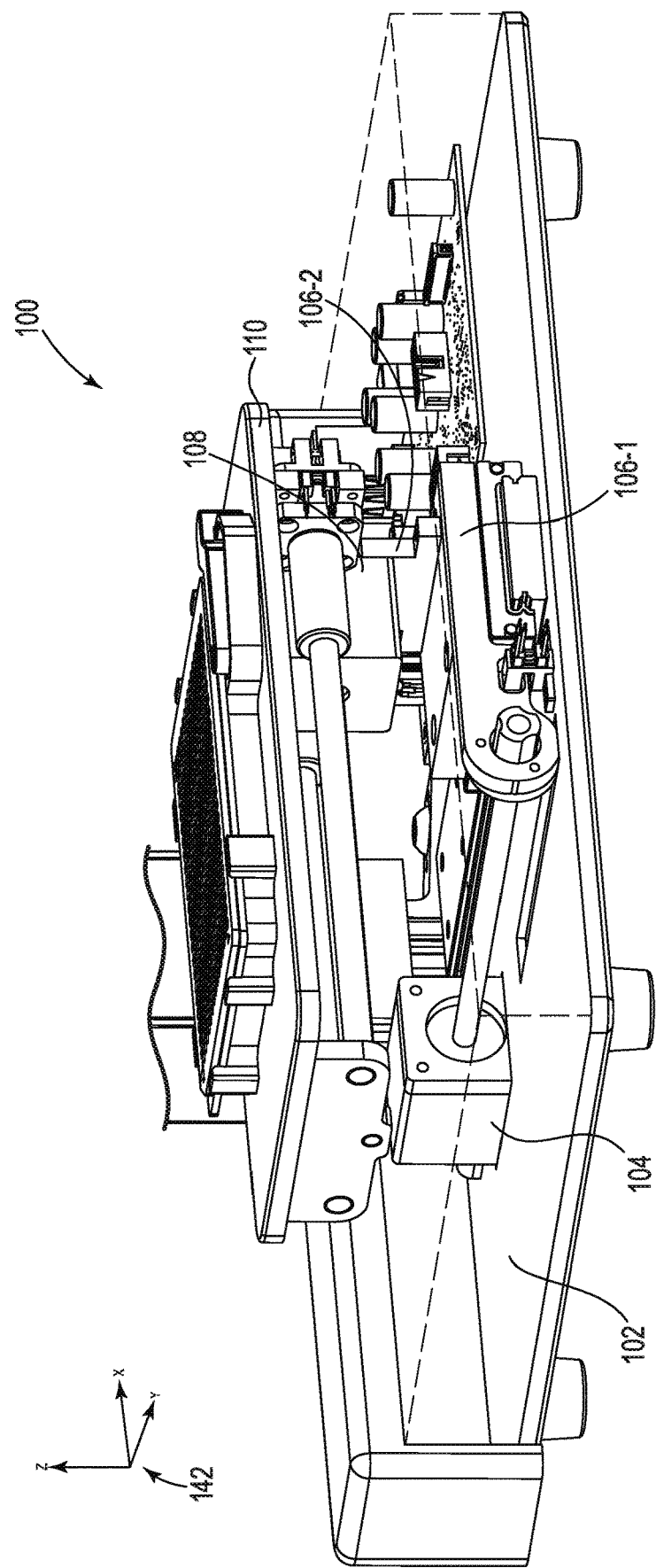
FIG. 1 illustrates an example platform consistent with the present disclosure.

Microfluidic dispenser systems can be utilized to dispense a specific quantity (e.g., picoliters, etc.) of a liquid or media on to a substrate. For example, microfluidic dispenser systems can be utilized to dispense solvent-based pharmaceutical compounds and/or aqueous-based biomolecules with a thermal inkjet (TIJ) into a plurality of wells of a well plate substrate. Microfluidic dispenser systems can be relatively large and/or expensive devices, but can provide a system of precise dispensing.

The systems and devices for dispenser platforms described herein can provide for a relatively lower cost microfluidic dispenser. In some examples, dispenser platforms described herein can provide a relatively smaller footprint (e.g., space occupied by the microfluidic dispenser, etc.) that can be utilized as a benchtop system. In addition, the dispenser platforms described herein can increase a flexibility of substrate types and/or substrate sizes that can be utilized.

A number of systems and devices for a dispenser platform are described herein. In some examples, a dispenser platform can include an enclosure that includes a first actuator to move a support in a first plane, wherein a portion of the support extends outside the enclosure, and a second actuator coupled to the portion of the support that extends outside the enclosure to move a stage coupled to the support in a second plane. As used herein, a platform may include a device to hold a substrate nest and move the substrate nest to along a plane. In some examples, the platform can be coupled to a dispenser device. As used herein, a dispenser device includes a device for dispensing a fluid or media on to a substrate or substrate nest. In some examples, the dispenser device may include a microfluidic dispenser device that can deposit a specific quantity of a liquid or media at a specific location on the substrate nest coupled to the platform.

In some examples, the platform can be utilized to couple a substrate nest positioned below a dispenser nozzle that can dispense a liquid or media on to the substrate nest. In some examples, the platform can position a specific location below the dispenser nozzle such that the dispenser nozzle can dispense a specific quantity of liquid or media on to the specific location of the substrate nest. For example, the substrate nest can couple a well plate substrate that includes a plurality of wells to receive the liquid or media dispensed by the dispenser nozzle.

In some examples, the platform can include a first actuator to move the substrate nest in a first plane (e.g., Y direction, Y plane, Y-axis, etc.) and a second actuator to move the substrate nest in a second plane (e.g., X direction, X plane, X-axis, etc.). In these examples, the first actuator and the second actuator can be utilized to move a particular well of a well plate substrate to a specific location such that the liquid or media can be deposited within the particular well. In some examples, the platform can be utilized to provide flexibility in substrate types and/or sizes. This can be accomplished by providing a second actuator that is positioned outside of the enclosure as described herein. Thus, when the second actuator is positioned outside of the enclosure the travel of the stage positioned on the second actuator is not limited by the enclosure. In addition, having a slot positioned on a top portion of the enclosure to expose only a portion of a support coupled to the first actuator within the enclosure can provide protection for the first actuator as well as protection to a user from the first actuator. In addition, having the first actuator positioned within the enclosure can provide aesthetic benefits compared to previous systems or devices.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example platform 100 consistent with the present disclosure. In some examples, the platform 100 can include an enclosure 102 (illustrated such that components positioned within the enclosure 102 can be illustrated). The enclosure 102 can be utilized to protect components within the enclosure 102. For example, the enclosure 102 can be utilized to protect an actuator 104 coupled within the enclosure 102. As described herein, the platform 100 can include a first actuator 104 and a second actuator 108 to move a stage 110 along a first plane and a second plane respectively.

As used herein, the stage 110 may be utilized, in some examples, to hold a substrate nest and move the substrate nest into a specific location below a dispenser nozzle such that the dispenser nozzle can deposit a specific quantity of liquid or media at the specific location on the substrate nest. In some examples, the stage 110 can be utilized to move in a first plane and a second plane to position the substrate nest coupled to the stage 110 at a specific location of the platform 100.

In some examples, the first actuator 104 can be a mechanical actuator (e.g., shaft actuator, belt actuator, chain actuator, etc.) that can be utilized to move a device (e.g., stage 110, etc.) along a plane or axis as described herein. In one example, the first actuator 104 can be a linear actuator. As used herein, a linear actuator can include a motorized device for rotating a screw or shaft to move a device in a linear direction. For example, the first actuator 104 can be a motor to rotate a shaft coupled to a first portion of a support 106-1. In this example, the first actuator 104 can rotate the shaft in a first direction to move the first portion of the support 106-1 in a first direction and the first actuator 104 can rotate the shaft in a second direction to move the first portion of the support 106-1 in a second direction.

In this way, the first actuator 104 can move the support 106-1, 106-2, referenced together herein as support 106 along a first plane or axis (e.g., a plane that includes a first direction that is toward the first actuator 104 and a second direction that is away from the first actuator 104). For example, the first actuator 104 can be a linear actuator that can move the support 106 in a linear direction in the plane of the first actuator 104 and/or in the plane or longitudinal axis of the shaft coupled to the first actuator 104 and the first portion of the support 106-1. In some examples, movement along the first plane by the first actuator 104 can refer to movement along a Y-axis as represented by compass 142.

In some examples, the first portion of the support 106-1 can be positioned within the enclosure 102. In some examples, the first portion of the support 106-1 can be coupled to a rail to provide a base of support for the first portion of the support 106-1. For example, the first portion of the support 106-1 can be positioned on a rail that is directly coupled to a bottom portion of the enclosure 102 to provide a relatively stronger base, as illustrated in FIG. 1, to prevent unwanted movement of the stage 110 in an upward or downward direction (e.g., Z-axis as illustrated by compass 442, etc.). In this example, the second portion of the support 106-2 can be coupled to the first portion of the support 106-1 such that the second portion of the support 106-2 is positioned over the rail.

In some examples, the second portion of the support 106-2 can extend from a position within the enclosure 102 to a position outside the enclosure 102. For example, the enclosure 102 can include a slot aperture to allow the second portion of the support 106-2 to extend outside the enclosure 102 and move in or parallel to the first plane via the first actuator 104 as described herein. In some examples, the platform 100 can include a second actuator 108 coupled to the second portion of the support 106-2.

In some examples, the second actuator 108 can be coupled at a position that is outside the enclosure 102. For example, the second actuator 108 can be coupled to a portion of the second portion of the support 106-2 that extends outside the enclosure 102. In some examples, the second actuator 108 can be the same or similar device as the first actuator 104. For example, the second actuator 108 can be a linear actuator that can rotate a shaft coupled to the second actuator 108 to move the stage 110 in a second plane. For example, the second actuator 108 can move the stage 110 along a X-axis as illustrated by compass 142. In some examples, the second actuator 108 can move the stage 110 in a second plane that is perpendicular to the first plane. For example, the first plane can include directions from the rear of the platform 100 to the front of the platform and vice versa as illustrated in FIG. 1 and the second plane can include directions from a left side of the platform 100 to a right side of the platform 100 and vice versa as illustrated in FIG. 1.

Figure 2:
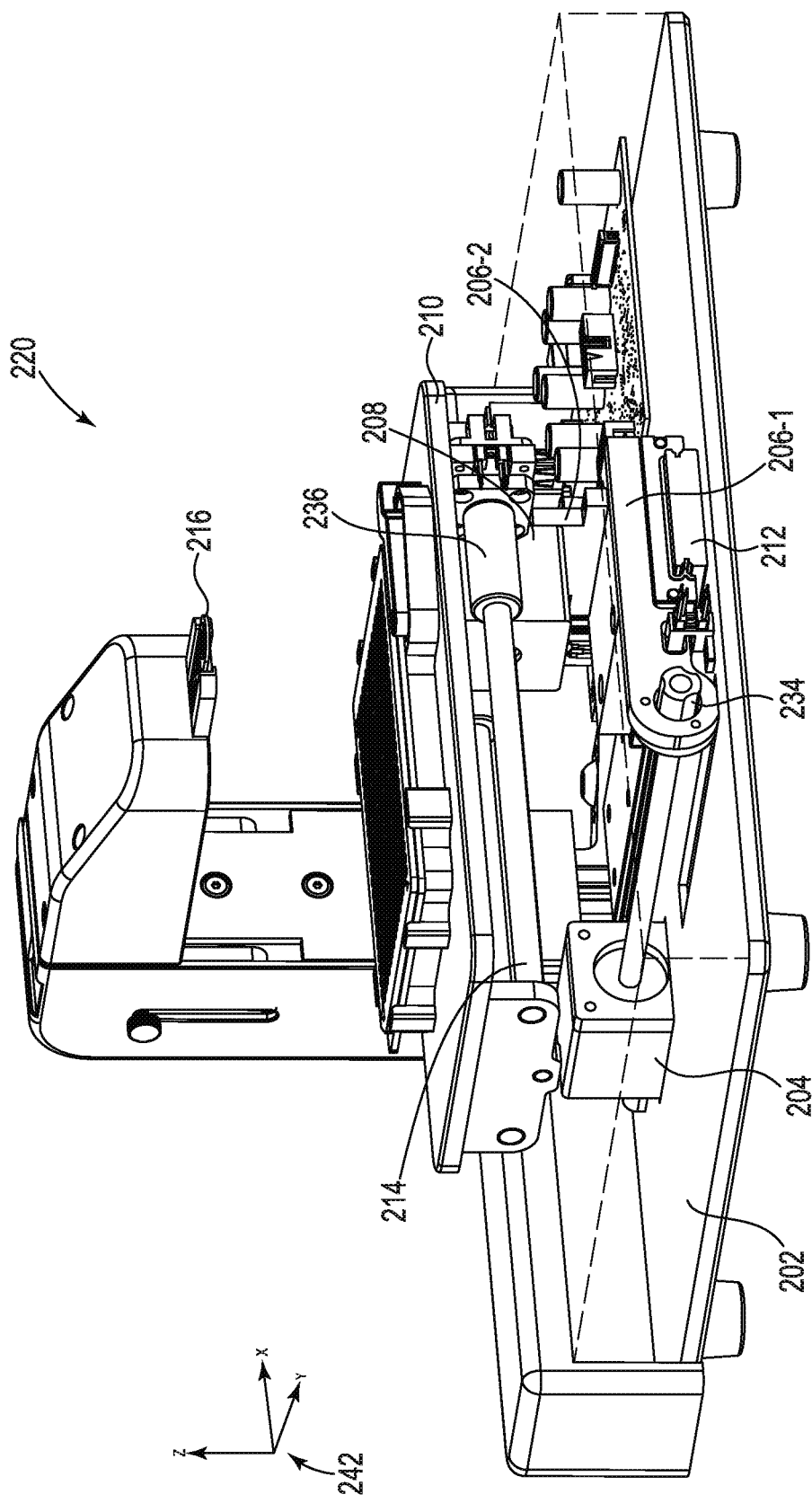
FIG. 2 illustrates an example system for a dispenser platform consistent with the present disclosure.

FIG. 2 illustrates an example system 220 for a dispenser platform consistent with the present disclosure. In some examples, the system 220 can include the same or similar elements as the platform 100 as illustrated in FIG. 1. In some examples, the system 220 can include an enclosure 202 (illustrated such that components positioned within the enclosure 202 can be illustrated). The enclosure 202 can be utilized to protect components within the enclosure 202. For example, the enclosure 202 can be utilized to protect an actuator 204 coupled within the enclosure 202. As described herein, the system 220 can include a first actuator 204 and a second actuator 208 to move a stage 210 along a first plane and a second plane respectively. As described herein, movement of the stage 210 by the first actuator 204 can refer to movement along a Y-axis as illustrated by compass 242 and movement of the stage 210 by the second actuator 208 can refer to movement along a X-axis as illustrated by compass 242.

In some examples, the system 220 can include a base (e.g., enclosure 202, etc.) to enclose a first actuator 204, a first portion of a support 206-1 coupled to a rail 212, and a linear bearing 234 to move the support 206 along a first plane, a stage 210 coupled to a rail system 214 that is coupled to a second actuator 208 and a second portion of the support 206-2 to move the stage 210 along a second plane, and a dispenser nozzle 216 coupled to the base to dispense a liquid on the stage 210.

As described herein, the stage 210 can be utilized to hold a substrate nest and moving the substrate nest into a specific location below a dispenser nozzle 216 such that the dispenser nozzle 216 can deposit a specific quantity of liquid or media at the specific location on the substrate nest. In some examples, the stage 210 can be utilized to move in a first plane and a second plane to position the substrate nest coupled to the stage 210 at a specific location.

In some examples, the first actuator 204 can be linear actuator. As used herein, a linear actuator can include a motorized device for rotating a screw or shaft to move a device in a linear direction. For example, the first actuator 204 can be a motor to rotate a shaft coupled to a linear bearing 234 that can move relative to the rotation of the shaft. As used herein, a linear bearing 234 can include a threaded interior that corresponds to a thread of the shaft to move the first portion of the support 206-1. In some examples, the linear bearing 236 can include a linear bearing that slides on the shaft 214. For example, a threaded shaft can pass through a portion of the actuator 208 to a threaded portion within the actuator 208 to move the stage 210 as described herein. That is, the actuator 208 can be coupled to a threaded shaft that passes through the actuator 208 to move the stage 201 as described herein.

In this way, the first actuator 204 can move the support 206-1, 206-2, referenced together herein as support 206 along a first plane (e.g., a plane that includes a first direction that is toward the first actuator 204 and a second direction that is away the first actuator 204). For example, the first actuator 204 can be a linear actuator that can move the support 206 in a linear direction in the plane of the first actuator 204 and/or in the plane of the shaft coupled to the first actuator 204 and the first portion of the support 206-1.

In some examples, the first portion of the support 206-1 can be positioned within the enclosure 202. In some examples, the first portion of the support 206-1 can be coupled to a rail 212 to provide a base of support for the first portion of the support 206-1. For example, the first portion of the support 206-1 can be positioned on a rail 212 that is directly coupled to a bottom portion of the enclosure 202 to provide a relatively stronger base, as illustrated in FIG. 2, to prevent unwanted movement of the stage 210 in an upward or downward direction. In this example, the second portion of the support 206-2 can be coupled to the first portion of the support 206-1 such that the second portion of the support 206-2 is positioned over the rail 212.

In some examples, the second portion of the support 206-2 can extend from a position within the enclosure 202 to a position outside the enclosure 202. For example, the enclosure 202 can include a slot aperture to allow the second portion of the support 206-2 to extend outside the enclosure 202 and move in or parallel to the first plane via the first actuator 204 as described herein. In some examples, the system 220 can include a second actuator 208 coupled to the second portion of the support 206-2.

In some examples, the second actuator 208 can be coupled at a position that is outside the enclosure 202. For example, the second actuator 208 can be coupled to a portion of the second portion of the support 206-2 that extends outside the enclosure 202. In some examples, the second actuator 208 can be the same or similar device as the first actuator 204. For example, the second actuator 208 can be a linear actuator that can rotate a shaft coupled to the second actuator 208 to move the stage 210 in a second plane. For example, the second actuator 208 can move the stage 210 along a X-axis as illustrated by compass 242. In another example, the second actuator 208 can be a motor to rotate a shaft coupled to a linear bearing 236 that can move relative to the rotation of the shaft 214. As described herein, the linear bearing 236 can include slide on the shaft 214 when the actuator 208 is moving the stage 210. In some examples, the stage 210 can be coupled to a rail 214 that is coupled to the second portion of the support 206-2. For example, the rail 214 can be positioned from a first end of the stage 210 to a second end of the stage 210 to provide support for the stage 210.

In some examples, a size of the stage 210 can be adjustable to a plurality of different sizes. For example, the rail 214 can be extendable to a larger size and/or reduced to a smaller size and a corresponding stage size can be coupled to the rail 214. In some examples, utilizing a first actuator 204 and a second actuator 208 that are linear actuators can provide additional stability for a plurality of different stage sizes.

In some examples, the second actuator 208 can move the stage 210 in a second plane that is perpendicular to the first plane. For example, the first plane can include directions from the rear of the system 220 to the front of the system 220 and vice versa as illustrated in FIG. 2 and the second plane can include directions from a left side of the system 220 to a right side of the system 220 and vice versa as illustrated in FIG. 2.

Figure 3:
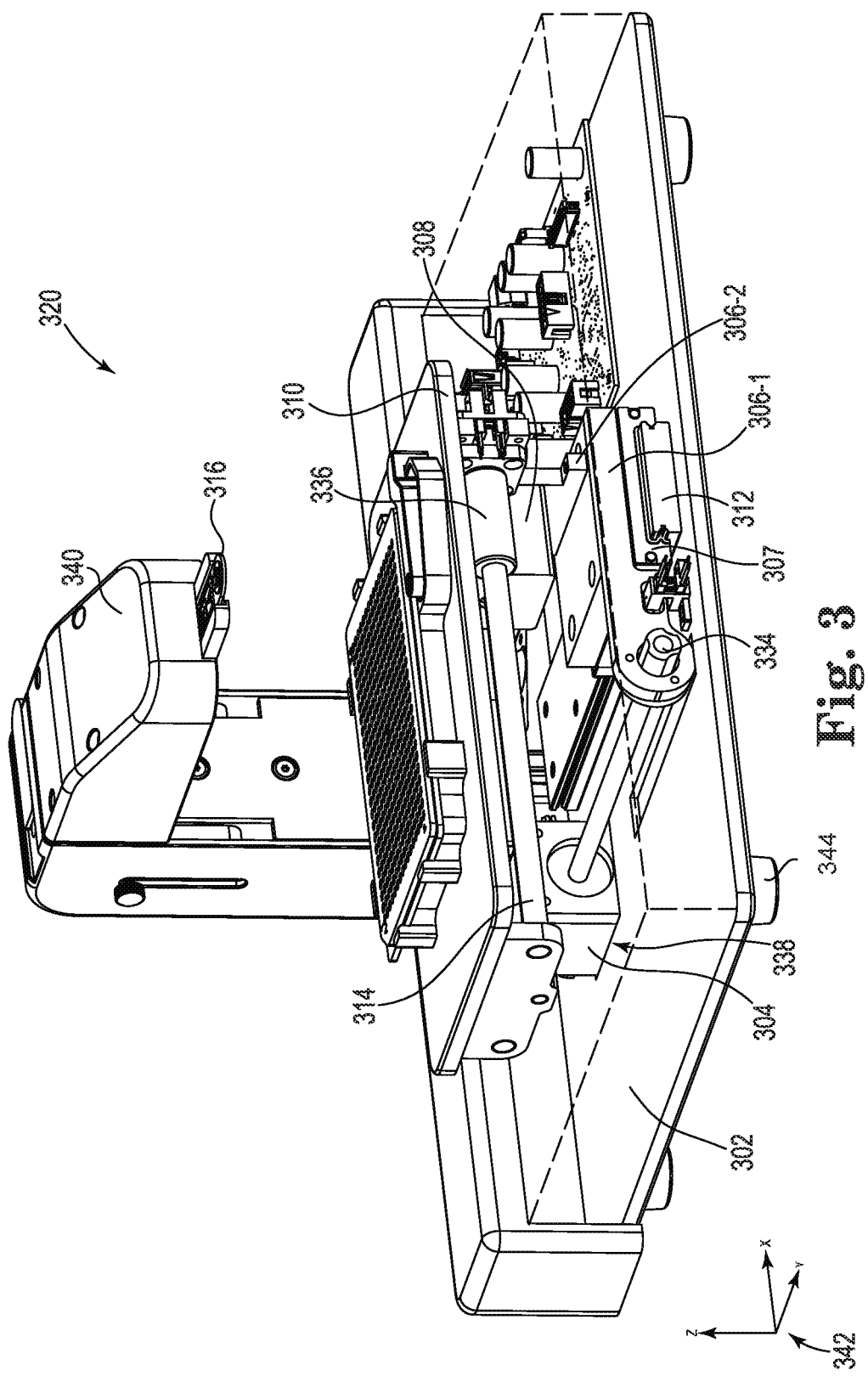
FIG. 3 illustrates an example system for a dispenser platform consistent with the present disclosure.

FIG. 3 illustrates an example system 320 for a dispenser platform consistent with the present disclosure. In some examples, the system 320 can include the same or similar elements as the platform 100 as illustrated in FIG. 1 and/or the system 220 as illustrated in FIG. 2. In some examples, the system 320 can include an enclosure 302 (illustrated such that components positioned within the enclosure 302 can be illustrated). The enclosure 302 can be utilized to protect components within the enclosure 302. For example, the enclosure 302 can be utilized to protect an actuator 304 coupled within the enclosure 302. As described herein, the system 320 can include a first actuator 304 and a second actuator 308 to move a stage 310 along a first plane and a second plane respectively.

In some examples, the system 320 can include a base enclosure 302 coupled to an arm 340 (e.g., dispenser arm, etc.) that is adjustable along a first plane (e.g., z-plane as illustrated by compass 342, etc.), wherein the arm 340 extends above the base enclosure 302 and includes a single dispenser jet (e.g., dispenser nozzle 316) to dispense microfluidic droplets. In some examples, the single dispenser jet can include a single nozzle to dispense liquid or media as described herein. In some examples, the single dispenser jet or dispenser nozzle 316 can include a plurality of nozzles (e.g., 20 nozzles, etc.) that can each dispense a liquid or media as described herein.

In some examples, the system 320 can include a first actuator 304 coupled to an interior portion of the base enclosure 302 to move a support 306-1, 306-2 along a second plane (e.g., y-plane as illustrated by compass 342, etc.), wherein the first actuator 304 is coupled to a first end of a support (e.g., first portion of the support 306-1, etc.) that extends from the interior portion of the base enclosure 302 to an exterior portion of the base enclosure 302 and a second actuator 308 coupled to the exterior portion of the base enclosure 302 to move a stage 310 along a third plane e.g., x-plane as illustrated by compass 342, etc.), wherein the second actuator 308 is coupled to a second end of the support (e.g., second portion of the support 306-2, etc.) that is positioned at the exterior portion of the base enclosure 302.

As described herein, the stage 310 can be utilized to hold a substrate nest and moving the substrate nest into a specific location below a dispenser nozzle 316 such that the dispenser nozzle 316 can deposit a specific quantity of liquid or media at the specific location on the substrate nest. As described herein, the dispenser nozzle 316 can be a single nozzle or a plurality of nozzles to deposit a liquid or media on the substrate or substrate nest coupled to the stage 310. In some examples, the stage 310 can be utilized to move in a first plane and a second plane to position the substrate nest or substrate coupled to the stage 310 at a specific location.

As described herein, the first actuator 304 can be linear actuator. In this way, the first actuator 304 can move the support 306-1, 306-2 referenced together herein as support 306 along a first plane (e.g., a plane that includes a first direction that is toward the first actuator 304 and a second direction that is away the first actuator 304). For example, the first actuator 304 can be a motor to rotate a shaft coupled to a linear bearing 334 that can move relative to the rotation of the shaft. As used herein, a linear bearing 334, 336 can include a threaded interior that corresponds to a thread of the shaft to move the first portion of the support 306-1. In some examples, the linear bearing 336 can be stationary relative to the second actuator 308 when the second actuator 308 moves the stage 310 coupled to the second portion of the support 306-2 in the second plane (e.g., Y-axis as illustrated by compass 342, etc.).

In some examples, the first portion of the support 306-1 can be positioned within the enclosure 302. In some examples, the first portion of the support 306-1 can be coupled to a rail 312 to provide a base of support for the first portion of the support 306-1. For example, the first portion of the support 306-1 can be positioned on a rail 312 that is directly coupled to a bottom portion of the enclosure 302 to provide a relatively stronger base, as illustrated in FIG. 3, to prevent unwanted movement of the stage 310 in an upward or downward direction. In this example, the second portion of the support 306-2 can be coupled to the first portion of the support 306-1 such that the second portion of the support 306-2 is positioned over the rail 312.

In some examples, the first portion of the support 306-1 can be coupled to the rail 312 via a rail portion 307. For example, the rail portion 307 can positioned around the rail 312 to prevent movement of the first portion of the support 306-1 in the x-plane as illustrated by the compass 342. In this way, the second actuator 308 can move the stage 310 in the x-plane on the rail 314 without the first portion of the support 306-1 moving in the x-plane. Thus, in some examples, the first actuator 304 can move the first portion of the support 306-1 and/or the stage 310 in the y-plane while the second actuator 308 can move the stage 310 in the x-plane.

In some examples, the second portion of the support 306-2 can extend from a position within the enclosure 302 to a position outside the enclosure 302. For example, the enclosure 302 can include a slot aperture to allow the second portion of the support 306-2 to extend outside the enclosure 302 and move in or parallel to the first plane via the first actuator 304 as described herein. In some examples, the system 320 can include a second actuator 308 coupled to the second portion of the support 306-2.

In some examples, the system 320 can include a plurality of feet 344 coupled to a side of the base enclosure 302. In some examples, a first portion of the first actuator 304 can be positioned within the base enclosure 302 and a second portion of the first actuator can be positioned between the base enclosure 302 and an end of the plurality of feet 344. That is, the first actuator 304 can be coupled within an aperture 338 of the base enclosure 302 such that a portion of the first actuator 304 is positioned between a bottom of the base enclosure 302 and the feet 344. In some examples, the first actuator 304 can be positioned within the aperture 338 to lower a coupling point of the first actuator 304.

As used herein, a coupling point of an actuator (e.g., coupling point of the first actuator 304, etc.) can be a point where the actuator is coupled to a shaft or device that the actuator is rotating. For example, the coupling point of the first actuator 304 can be a point where the first actuator 304 is coupled to a shaft, as described herein. In some examples, lowering the coupling point of the first actuator 304 can be utilized to lower an overall height of the system 320. In some examples, the first actuator 304 can be positioned within the aperture 338 to align the coupling point of the first actuator 304 with the linear bearing 334.

Figure 4:
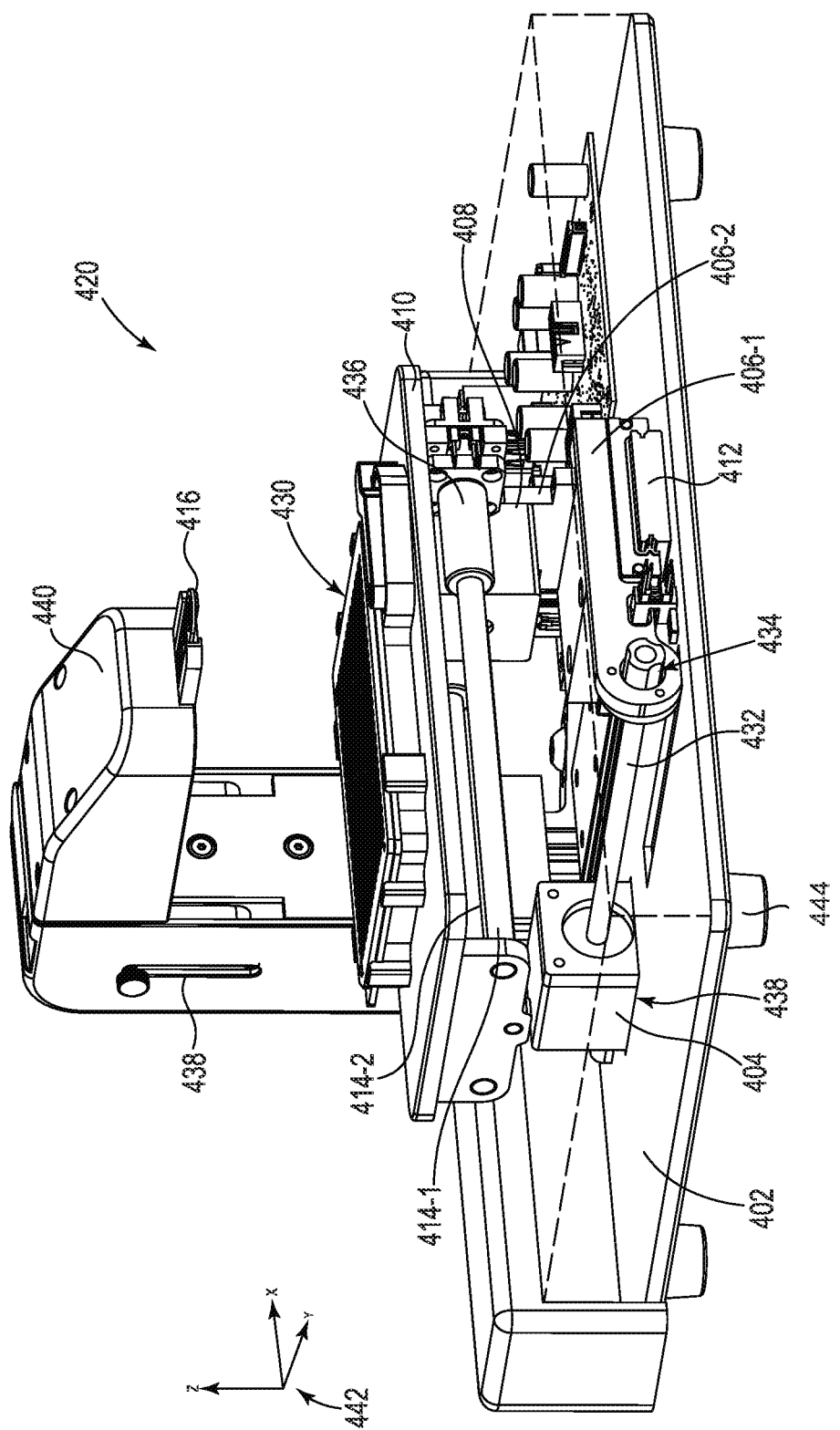
FIG. 4 illustrates an example system for a dispenser platform consistent with the present disclosure.

FIG. 4 illustrates an example system 420 for a dispenser platform consistent with the present disclosure. In some examples, the system 420 can include the same or similar elements as the platform 100 as illustrated in FIG. 1, the system 220 as illustrated in FIG. 2, and/or the system 320 as illustrated in FIG. 3. For example, the system 420 can include a first actuator 404 to move the support 406-1, 406-2 referenced together herein as 406 in a first plane and a second actuator 408 to move a stage 410 in a second plane. For example, the second actuator 408 can move the stage 410 along a X-axis as illustrated by compass 442. As described herein, the first plane can be perpendicular with the second plane. As described herein, movement of the stage 410 by the first actuator 404 can refer to movement along a Y-axis as illustrated by compass 442 and movement of the stage 410 by the second actuator 408 can refer to movement along a X-axis as illustrated by compass 442.

In some examples, the system 420 can include a substrate nest 430 coupled to the stage 410. As used herein, the substrate nest 430 can include a device that can couple a substrate to the stage 410. For example, the substrate nest 430 can be a well plate substrate that includes a plurality of wells for receiving a liquid or media from a dispenser nozzle 416 coupled to an arm 440 coupled to the base enclosure 402 of the system 420. As described herein, the dispenser nozzle 416 can include a single nozzle or a plurality of nozzles to deposit a specific quantity of liquid or media at a specific location. In some examples, the arm 440 can be utilized to alter a position of the dispenser nozzle 416 in a third plane that is different than the first plane and the second plane. For example, the arm 440 can include a height adjustor 438 to alter a distance between the dispenser nozzle 416 and the substrate nest 430. In this way, a height of the dispenser nozzle 416 can be adjusted based on a type of substrate nest 430 coupled to the stage 410.

As described herein, the first actuator 404 can be positioned within the base enclosure 402. In some examples, the first actuator 404 can be coupled within an aperture 438 of the base enclosure 402. In these examples, the first actuator 404 can protrude from a bottom of the base enclosure 402 to align a shaft 432 with a linear bearing 434 coupled to a first portion of a support 406-1. That is, a portion of the first actuator 404 can be positioned between the bottom of the base enclosure 402 and a bottom portion of feet 444 coupled to the bottom of the base enclosure 402.

As described herein, the first portion of the support 406-1 can be coupled to a rail 412 and move in a first plane along the rail 212 when the actuator 404 rotates the shaft 432 and the shaft 432 rotates within the linear bearing 434. As described herein, the second portion of the support 406-2 can be coupled to the first portion of the support 406-1. In some examples, the second portion of the support 406-2 can be positioned over the rail 412 such that the rail 412 provides additional support for the second portion of the support 406-2. In some examples, the second actuator 408 can be coupled to the second portion of the support 406-2. As described herein, the second actuator 408 can be coupled to a linear bearing 436 that can move the stage 410 in a second plane.

In some examples, a plurality of rails 414-1, 414-2 can be coupled to the second portion of the support 406-2. In some examples, the plurality of rails 414-1, 414-2 can be positioned below a surface of the stage 410 as illustrated in FIG. 4. In some examples, the plurality of rails 414-1, 414-2 can be utilized to support the stage 410 from a first end to a second end. In some examples, the plurality of rails 414-1, 414-2 can be utilized to extend a size of the stage 410.

As described herein, the system 420 can be utilized to position a specific location of the substrate nest 430 below the dispenser nozzle 416 such that the dispenser nozzle 416 can deposit a specific quantity of liquid or media at the specific location of the substrate nest 430. In some examples, the platform of the system 420 can be utilized to move the stage 410 and/or substrate nest 430 coupled to the stage 410 utilizing a first actuator 404 and a second actuator 408.

Figure 5:
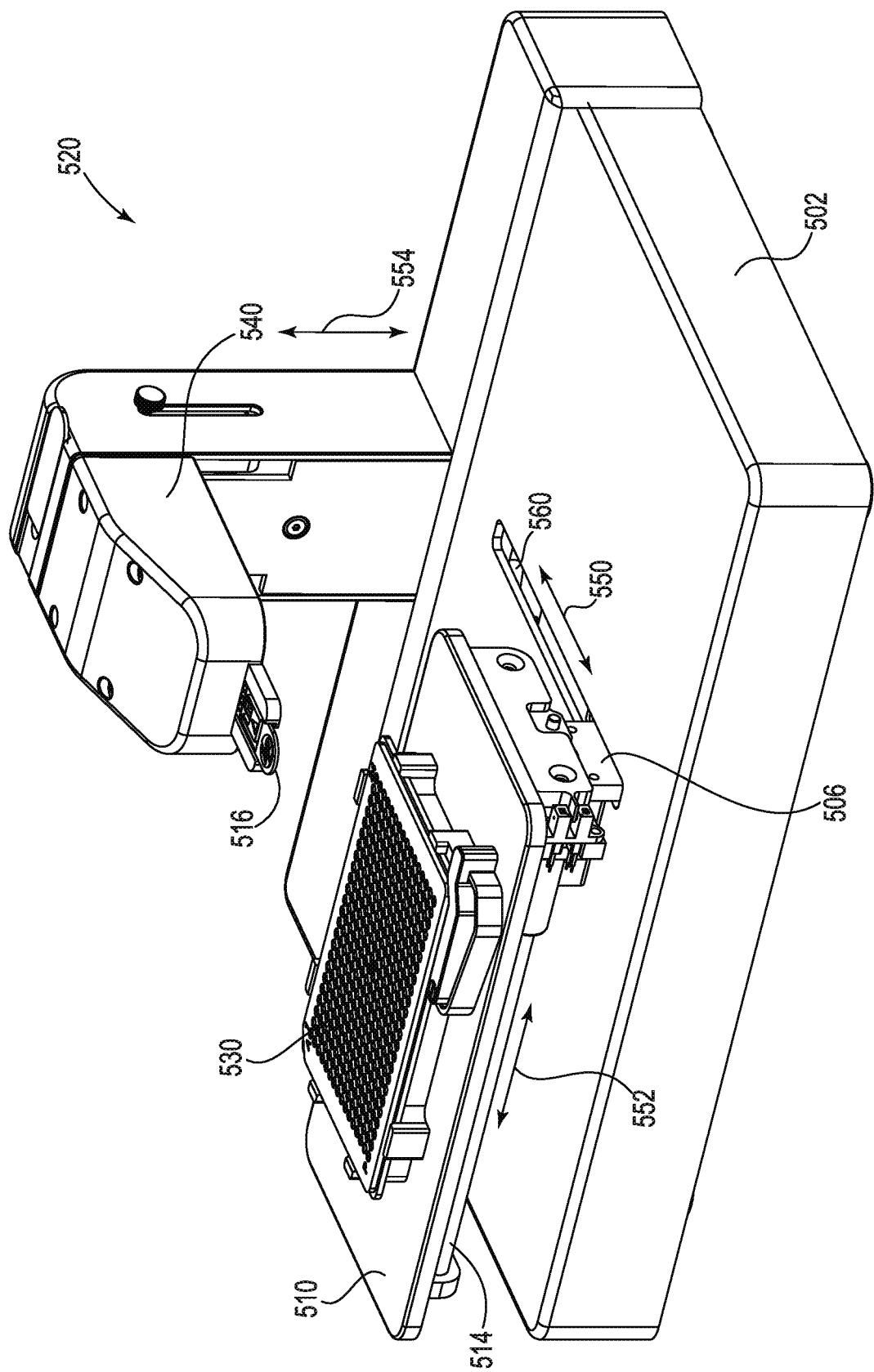
FIG. 5 illustrates an example system for a dispenser platform consistent with the present disclosure.

FIG. 5 illustrates an example system 520 for a dispenser platform consistent with the present disclosure. In some examples, the system 520 can include the same or similar elements as the platform 100 as illustrated in FIG. 1, the system 220 as illustrated in FIG. 2, the system 320 as illustrated in FIG. 3, and/or the system 420 as illustrated in FIG. 4. For example, the system 520 can include a first actuator to move the support 506 and/or stage 510 in a first plane 550 and a second actuator to move the stage 510 in a second plane 552. For example, the second actuator 508 can move the stage 510 along a X-axis as illustrated by compass 542. As described herein, the first plane 550 can be perpendicular with the second plane 552.

In some examples, the system 520 can include a base enclosure 502 to enclose the first actuator and a portion of the support 506 coupled to a rail. As described herein, a portion of the support 506 can protrude through a slot aperture 560 of the enclosure 502. In addition, a second actuator can be coupled to the portion of the support 506 that is outside the base enclosure 502. As described herein, the slot aperture 560 can allow the support 506 to move in the first plane 550. In some examples, the second actuator can be positioned above the base enclosure 502 such that the second actuator can move the stage 510 and/or the substrate nest 530 in the second plane 552.

As described herein, the system 520 can move the stage 510 and/or the substrate nest 530 along the first plane 550 and the second plane 552 to position the substrate nest 530 at a specific location below the dispenser nozzle 516 coupled to an arm 540 that extends over the base enclosure 502. As described herein, the dispenser nozzle 516 can be utilized to dispense a specific quantity of liquid or media at the specific location below the dispenser nozzle 516. In this way, the substrate nest 530 can include a plurality of locations to receive liquid or media provided by the dispenser nozzle 516.

In some examples, the arm 540 can be utilized to extend the dispenser nozzle 516 over the stage 510 and/or substrate nest 530. In some examples, the arm 540 can be utilized to move the dispenser nozzle 516 in a third plane 554. For example, the arm 540 can adjust a distance between the dispenser nozzle 516 and a surface of the stage 510 and/or substrate nest 530. For example, the stage 510 can be utilized to coupled different types of substrate nests 530. In this example, a first substrate nest type may utilize a first distance between the dispenser nozzle 516 and the first substrate nest type and a second substrate nest type may utilize a second distance between the dispenser nozzle 516 and the second substrate nest type.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A dispenser platform, comprising:
a support including a first portion and a second portion;
a stage coupled to the support;
an enclosure that includes a first actuator to move the support in a first plane, wherein the first portion of the support is within and enclosed by the enclosure and the second portion of the support extends outside the enclosure;
a second actuator coupled to the second portion of the support that extends outside the enclosure to move the stage in a second plane that is perpendicular to the first plane; and
a first shaft, a second shaft, a first linear bearing, and a second linear bearing, wherein:
the first actuator is coupled to the first shaft coupled to the first portion of the support and the first linear bearing is positioned on the first shaft, the first actuator to rotate the first shaft to move the first linear bearing and thereby cause the first portion of the support and the stage to move in the first plane; and
the second actuator is coupled to the second shaft coupled to the second portion of the support and the second linear bearing is positioned on the second shaft, the second actuator to rotate the second shaft to slide the second linear bearing and thereby cause the stage to move in the second plane.

2. The dispenser platform of claim 1, wherein the second portion of the support extends through a slot of the enclosure, wherein the second portion extends from a position within the enclosure to a position outside the enclosure through the slot.

3. The dispenser platform of claim 1, wherein the first plane includes a y-axis, the second plane includes an x-axis, and the dispenser platform further includes a rail coupled to the first portion of the support and to a bottom portion of the enclosure to mitigate unwanted movement of the stage in a z-axis during movement of the support in at least one of the first plane and the second plane, and wherein the second portion is positioned over the rail.

4. The dispenser platform of claim 1, wherein the second actuator is coupled to a linear bearing positioned on a shaft coupled to the stage.

5. The dispenser platform of claim 4, wherein the linear bearing is stationary relative to the second actuator when the second actuator moves the stage coupled to the support in the second plane.

6. The dispenser platform of claim 1, wherein:
the enclosure encloses the first actuator, the first portion of the support coupled to a rail, and a linear bearing to move the support along the first plane; and,
the stage is coupled to a rail system that is coupled to the second actuator and the second portion of the support to move the stage along the second plane, and wherein the dispenser platform further includes:
a dispenser jet coupled to the enclosure to dispense a liquid on the stage.

7. The dispenser platform of claim 1, wherein:
the first actuator is coupled to an interior portion of the enclosure to move the support along the first plane, wherein the first actuator is coupled to the first portion of the support that extends from the interior portion of the enclosure to an exterior portion of the enclosure;
the second actuator is coupled to the exterior portion of the enclosure to move the stage along the second plane, wherein the second actuator is coupled to the second portion of the support that is positioned at the exterior portion of the enclosure; and
the enclosure is coupled to an arm that is adjustable along a third plane, wherein the arm extends above the enclosure and includes a dispenser jet to dispense microfluidic droplets.

8. The dispenser platform of claim 1, wherein the second linear bearing is a slide on the second shaft that is stationary relative to the second actuator as the second actuator moves the stage in the second plane.

9. The dispenser platform of claim 1, further including a rail coupled to the second portion of the support and to the stage, wherein the rail is positioned from a first end of the stage to a second end of the stage.

10. A system, comprising:
a base to enclose a first actuator, a first portion of a support coupled to a rail, and a first linear bearing to move the support along a first plane, wherein the first portion of the support is within and enclosed by the base;
a support including the first portion and a second portion;
a stage coupled to the support and a rail system that is coupled to a second actuator and the second portion of the support to move the stage along a second plane, wherein the second portion of the support extends outside the base, wherein the second actuator is coupled to the second portion of the support that extends outside the base to move the stage in a second plane that is perpendicular to the first plane;

a dispenser jet coupled to the base to dispense a liquid on the stage; and the rail system including a first shaft, a second shaft, the first linear bearing, and a second linear bearing, wherein:

the first actuator is coupled to the first shaft coupled to the first portion of the support and the first linear bearing is positioned on the first shaft, the first actuator to rotate the first shaft to move the first linear bearing and thereby cause the first portion of the support and the stage to move in the first plane; and the second actuator is coupled to the second shaft coupled to the second portion of the support and the second linear bearing is positioned on the second shaft, the second actuator to rotate the second shaft to slide the second linear bearing and thereby cause the stage to move in the second plane.

11. The system of claim 10, wherein a size of the stage is adjustable to a plurality of different sizes.

12. The system of claim 10, comprising a plurality of feet coupled to a side of the base, wherein a first portion of the first actuator is positioned within the base and a second portion of the first actuator is positioned between the base and an end of the plurality of feet.

13. The system of claim 10, wherein the stage is positioned on an exterior portion of the base.

14. The system of claim 10, wherein the second linear bearing is coupled to a rail that is stationary to maintain a height of the stage relative to the dispenser jet.

15. The system of claim 10, wherein the dispenser jet includes an arm to extend the dispenser jet above the stage and adjust a height of the dispenser jet relative to the stage.

16. A dispenser, comprising:
a support including a first portion and a second portion;
a stage coupled to the support;
a first actuator coupled to an interior portion of a base enclosure to move the support along a first plane, the support including a first portion and a second portion, wherein the first actuator is coupled to the first portion of the support that extends from the interior portion of the base enclosure to an exterior portion of the base enclosure and is within and enclosed by the base enclosure;
a second actuator coupled to the exterior portion of the base enclosure to move the stage along a second plane that is perpendicular to the first plane, wherein the second actuator is coupled to the second portion of the support that is positioned at the exterior portion of the base enclosure;
the base enclosure that includes the first actuator and is coupled to an arm that is adjustable along a third plane, wherein the arm extends above the base and includes a dispenser jet to dispense microfluidic droplets; and
a first shaft, a second shaft, a first linear bearing, and a second linear bearing, wherein:

the first actuator is coupled to the first shaft coupled to the first portion of the support and the first linear bearing is positioned on the first shaft, the first actuator to rotate the first shaft to move the first linear bearing and thereby cause the first portion of the support and the stage to move in the first plane; and the second actuator is coupled to the second shaft coupled to the second portion of the support and the second linear bearing is positioned on the second shaft, the second actuator to rotate the second shaft to slide the second linear bearing and thereby cause the stage to move in the second plane.

17. The dispenser of claim 16, wherein the second shaft is a threaded shaft that passes through the second actuator.

18. The dispenser of claim 16, wherein the support extends from the interior portion of the base enclosure to the exterior portion of the base enclosure through a slot that allows the support to move along the first plane.

19. The dispenser of claim 16, wherein the dispenser jet is positioned directly above a portion of the stage when the stage moves along the first plane and the second plane.

* * * * *